F. H. ROYCE.
VEHICLE BRAKE.
APPLICATION FILED OCT. 27, 1911.
1,046,495.
Patented Dec. 10, 1912.
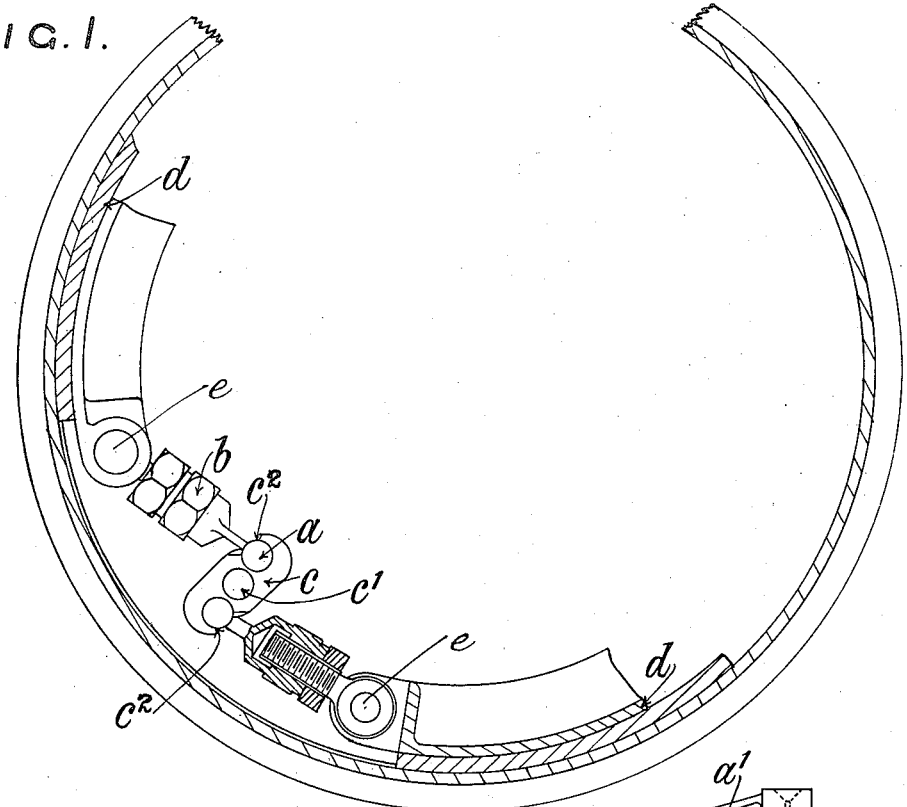
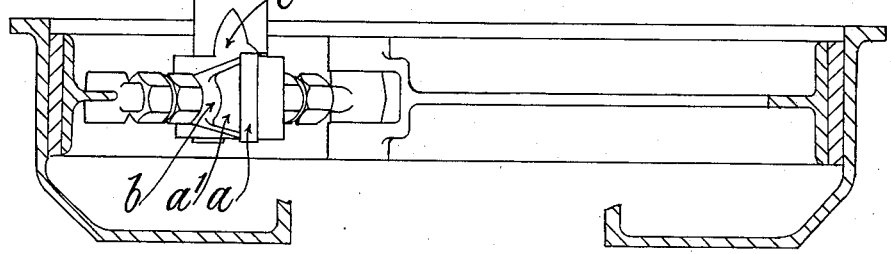
WITNESSES
INVENTOR
F. H. Royce.

UNITED STATES PATENT OFFICE.

FREDERICK HENRY ROYCE, OF DERBY, ENGLAND.

VEHICLE-BRAKE.

1,046,495.  Specification of Letters Patent.  Patented Dec. 10, 1912.

Application filed October 27, 1911.  Serial No. 657,148.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in and Relating to Vehicle-Brakes, of which the following is a specification, reference being had therein to the accompanying drawing.

This invention relates to that type of brake having an internal expanding member, and it has for its object obtaining the maximum bearing surface and strength in the working parts of the operating lever and connecting links by which the internal member is operated. I attain this end by the construction hereinafter fully described and shown in the accompanying drawing in which:—

Figure 1 is a view in side elevation, partly in section, Fig. 2 is a view in longitudinal section, and Fig. 3 is a view—on a larger scale—of one of the parts.

Throughout the views similar parts are marked with like letters of reference.

The pivotal pins $a$ by which the links $b$ connect the operating lever $c$ to the ends of the internal expanding member $d$ of the brake are made in one piece with the links $b$ and are of a length equal to the full width of the boss $c^1$ of the operating lever $c$ with which they engage. The pins are connected to their respective links by longitudinally arranged webs $a^1$ which extend the whole length of the pins, and the boss $c^1$ of the operating lever $c$ has axially arranged slots $c^2$ opening into the holes with which the pins $a$ engage so as to receive the webs $a^1$ and allow them free play with respect to the links.

The pins $a$ are engaged with the holes in the links $c$ by an endwise or axial movement. The links $b$ are preferably made in two parts as shown to provide for adjustment of the length of the internal expanding member $d$. This construction enables the complete bearing surface to be utilized for transmitting the force applied and also provides a ready means of withdrawing the internal member of the brake from the external member thereof.

What I claim as my invention, and desire to secure by Letters Patent is:—

In a brake, the combination, with a brake drum, and a flexible brake member arranged therein; of an operating shaft, a brake lever having its middle part secured on the said shaft and arranged inside the said drum and having a socket and a slot at each end portion, the slots being of less width than the sockets and having their open ends at the opposite sides of the lever, and links each formed of two longitudinally adjustable parts, one part of each link being pivoted to the corresponding end of the brake member, and the other part being provided with a relatively thin and broad web-plate and a pin of greater diameter than the thickness of the web-plate and engaging with the corresponding socket and slot of the said lever, said shaft, brake lever and links operating to expand and contract the brake member.

In testimony whereof I affix my signature in the presence of two witnesses.

FREDERICK HENRY ROYCE.

Witnesses:
 C. P. B. EDWARDS,
 JOHN DE LOOZE.